United States Patent

Nishimura et al.

Patent Number: 6,145,115
Date of Patent: Nov. 7, 2000

[54] DEVICE FOR DUPLICATING FUNCTIONS AND A METHOD FOR DUPLICATING FUNCTIONS

[75] Inventors: Kiyoshi Nishimura; Takaaki Fuchikami, both of Kyoto, Japan

[73] Assignee: Rohm Co., Ltd., Kyoto, Japan

[21] Appl. No.: 08/879,679

[22] Filed: Jun. 23, 1997

[30] Foreign Application Priority Data

Jun. 24, 1996 [JP] Japan .................................... 8-162742
Jun. 24, 1996 [JP] Japan .................................... 8-162743
Jun. 24, 1996 [JP] Japan .................................... 8-162746

[51] Int. Cl.[7] ...................................................... G06F 9/00
[52] U.S. Cl. ................................................................ 716/1
[58] Field of Search ................................ 364/488, 489, 364/490, 491, 578; 395/575; 716/1

[56] References Cited

U.S. PATENT DOCUMENTS

| 5,245,550 | 9/1993 | Miki | 364/490 |
| 5,317,726 | 5/1994 | Horst | 395/575 |
| 5,694,325 | 12/1997 | Fukuda | 364/468.28 |

*Primary Examiner*—Paul R Lintz
*Assistant Examiner*—Thuan Do
*Attorney, Agent, or Firm*—Merchant & Gould P.C.

[57] ABSTRACT

An object of the present invention is to duplicate functions of a first device into a second device so as to have the same functions as the first device. CPU 23 supplies a predetermined input data to both the second device 19 and the first device 17. A plurality of logic data for generating output data correspond to specific input data are stored in the hard disk 26 as candidates. The CPU 23 selects a candidate which makes both the output data generated by the second device 19 and the first device 17 identical with each other for all the supplied input data within the candidates. The CPU 23 outputs a rewrite command to the second device 19 so as to execute logic data of the candidate thus selected. The output data of the second device 19 identical with the output data generated by the first device 17 can be obtained for all the supplied input data.

19 Claims, 13 Drawing Sheets

FIG.3

| No | algorithms |
|---|---|
| 1 | output the inputted value as it is |
| 2 | output inverted input value |
| 3 | output inverted third bit, while outputting the first and the second bit as it is |
| 4 | output inverted second and third bit, while outputting the first bit as it is |
| 5 | output inverted first and third bit, while outputting the second bit as it is |
| ⋮ | ⋮ |

|  | input data | output data |
|---|---|---|
| FIG.6A | 000 → | 111 |
| FIG.6B | 001 → | 110 |
| FIG.6C | 111 → | 100 |
| FIG.6D | 010 → | 000 |

Algorithm of the third bit

Algorithm of the second bit

Algorithm of the first bit

6,145,115

DEVICE FOR DUPLICATING FUNCTIONS AND A METHOD FOR DUPLICATING FUNCTIONS

CROSS-REFERENCE TO RELATED APPLICATIONS

The entire disclosure of Japanese Patent Application No. Hei 8-162742, Hei 8-162743 and Hei 8-162746 all of which filed on Jun. 24, 1996 in Japan, the content of which is incorporated hereinto by reference.

BACKGROUND OF INVENTION

1. Field of the Invention

This invention relates to a device for duplicating functions which duplicates functions of a device to be duplicated outputting an output data correspond to an input data when the input data is supplied to the device to be duplicated, more specifically a method for duplicating functions.

2. Description of the Related Art

A programmable logic device (hereinafter referred to as PLD) is known as a large scaled integrated circuit (hereinafter referred to as LSI) capable of programming logic functions by a user(s). The PLD has a wide variety of devices such as a programmable logic array (hereinafter referred to as PLA) and a field programmable gate array (hereinafter referred to as FPGA). The PLA as an example of a small scaled PLD has a basic structure consist of an AND circuit part and an OR circuit part. Also, the FPGA is an example of a large scale PLD.

These PLDs are constructed so as to provide a number of logic circuits and the like on a chip for the LSI, and the logic circuits are connected one another through switches capable of programming. Thus, it is possible to realize desired logic functions by switching the switches in accordance with programs programmed by the user(s).

Thus, an LSI having desired logic functions can be realized in a short period of time by utilizing the PLD.

Besides, circuit analysis of a newly developed LSI is needed in case of making another LSI having the same functions with the newly developed LSI by duplication when specifications of the newly developed LSI is missing. It is difficult to carry out the circuit analysis even by the person having ordinary skill in the art because it requires expertise as well as much time.

DISCLOSURE OF INVENTION

It is an object of the present invention to provide a device for duplicating functions which duplicates functions of a device to be duplicated outputting an output data correspond to an input data into a device for rewriting when the input data is inputted thereto.

In accordance with characteristic of the present invention, a device for duplicating functions of a first device into a second device having rewritable logic circuit, the first device outputting an output data correspond to a predetermined input data supplied thereto, the device for duplicating functions comprises:

an input data supply means for supplying the predetermined input data to the first device and the second device, a storing means for storing a plurality of logic data as candidates for outputting an output data correspond to a specific input data, and a rewriting means for outputting a rewrite command for rewriting logic of a circuit in the second device, a logic of a candidate being selected from the candidates stored in the storing means so as to make a trial output data generated by the second device being identical with a reference output data generated by the first device for all the supplied input data.

In accordance with characteristic of the present invention, a method for duplicating functions of a first device into a second device having rewritable logic circuit, the first device outputting an output data correspond to a predetermined input data supplied thereto, the method comprises steps of:

step for storing a plurality of logic data as candidates for outputting an output data correspond to a specific input data, step for supplying the predetermined input data to the first device and a second device, step for outputting a rewrite command for rewriting logic of a circuit in the second device, the logic rewrited in the second device making a trial output data generated by the second device identical with a reference output data generated by the first device for all the supplied input data, the logic of the circuit being selected from the candidates.

While the novel features of the invention are set forth in a general fashion, both as to organization and content, it will be better understood and appreciated, along with other objections and features thereof, from the following detailed description taken in conjunction with the drawings.

BRIEF DESCRIPTION OF THE DRAWINGS

FIG. 3 is a table illustrating examples of algorithms stored in a hard disk 26.

FIG. 6A, 6B, 6C and 6D are examples of input data provided to a device to be duplicated and reference output data generated by a device for rewriting.

THE BEST MODE OF THE PRESENT INVENTION

An embodiment of the present invention is described herein with reference to the drawings attached hereto.

1. DESCRIPTION OF THE FUNCTIONAL BLOCK DIAGRAM

Figure 1:
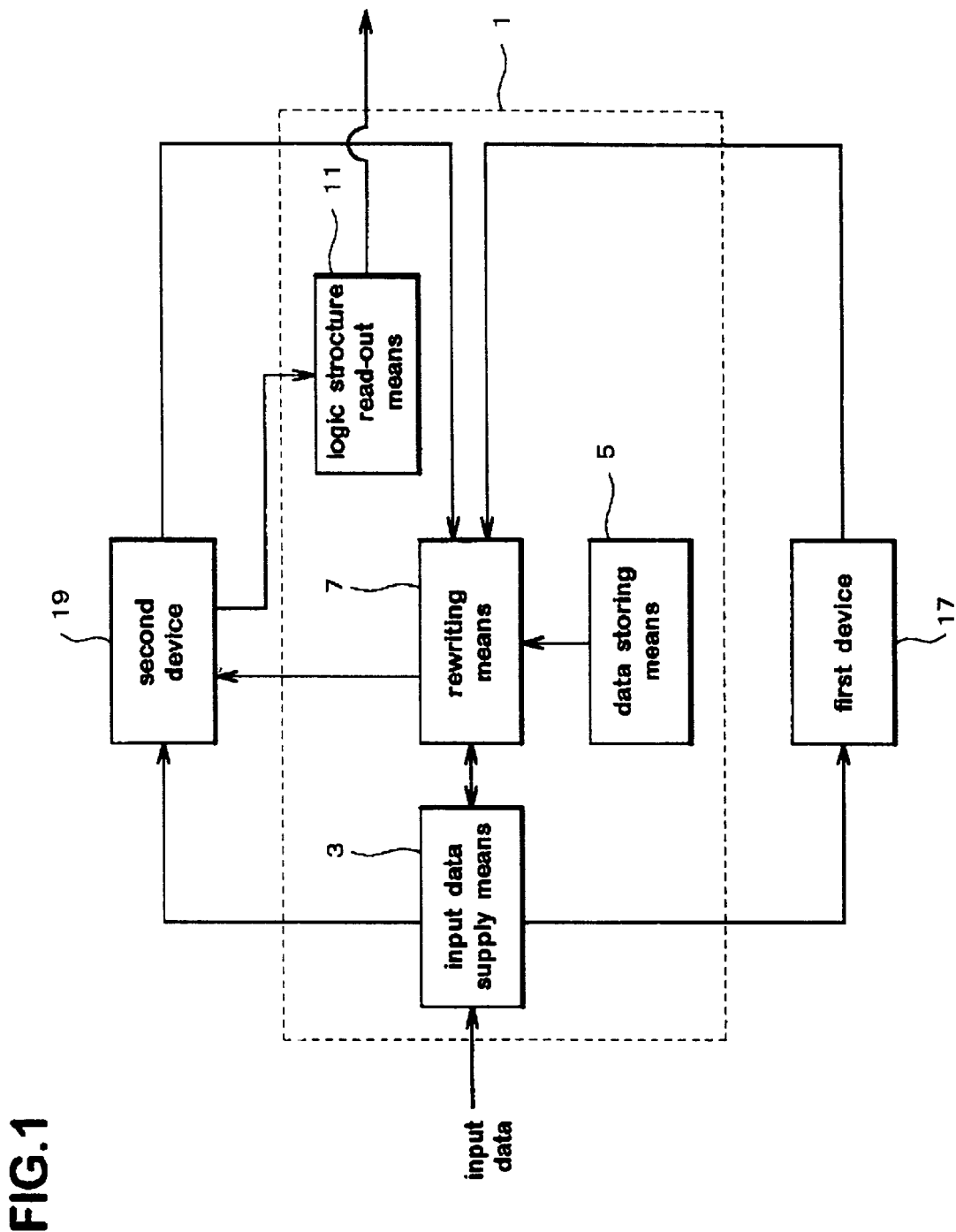
FIG. 1 is a functional block diagram of a device 1 for duplicating functions in the present invention.

A device for duplicating functions 1 shown in FIG. 1 is a device for duplicating functions of a first device into a second device having rewritable circuit, the first device outputting an output data correspond to a predetermined input data supplied thereto. The device 1 comprises an input data supply means 3, a data storing means 5, a rewriting means 7 and a logic structure read-out means 11.

The predetermined input data is supplied to both the second device 19 and the first device 17 by the input data supply means 3.

A plurality of logic data for generating output data correspond to a specific input data are stored in the data storing means 5 as candidates. The rewriting means 7 outputs a rewrite command for rewriting logic of a circuit in the second device 19. The logic thus rewrited makes a trial output data generated by the second device 19 being identical with a reference output data generated by the first device 17 for all the supplied input data. The logic of the circuit is selected from the candidates stored in the data storing means 5.

Logic structure of the second device 19 is read out by the logic structure read-out means 11, and the logic structure thus read out is outputted.

Thus, the output data of the second device 19 identical with the output data generated by the first device 17 can be obtained for all the supplied input data. So that, it is possible to make the second device 19 having the same functions as the first device 17 without carrying out analysis of functions thereof. Further, the second device 19 having the same functions with the first device 17 can be made easily and quickly without carrying out the judgement whether both the output data are identical with each other or not.

In addition, the rewriting means 7 optimizes processes described as below. The rewriting means 7 outputs the rewrite command to the second device 19 so as to execute the logic data of the candidate thus selected when the rewriting means 7 selects the candidate which makes both the output data generated by the second device 19 and the output data generated by the first device 17 identical with each other. And the supplied input data is stored by the rewriting means 7. Thereafter, the rewriting means 7 judges whether or not any candidate which makes both the outputs of the devices identical with each other for both the stored input data and a newly supplied input data are stored in the data storing means 5 when the newly input data is supplied. The rewriting means 7 outputs the rewrite command to the second device 19 so as to execute the logic data of the candidate thus selected when the candidate qualified above stated condition is selected by the rewriting means 7. Thus, it is possible to realize the second device 19 which is able to handle all the supplied input data in a certain phase as fast as possible with minimum capacity by optimizing the processes to the second device 19 sequentially. Further, it is possible for the second device 19 to handle more input data than ever without composing the structure of the device complex.

While, other process described in below can be carried out by the rewriting means 7. The rewriting means 7 outputs a rewrite command for providing a region in the second device 19, the region carrying out data in accordance with the supplied input data at the region provided in the second device 19 when a candidate which makes both the reference output data generated by the first device 17 and the trial output data generated by the second device 19 identical with each other for all the supplied input data can not be selected by the rewriting means 7. Therefore, it is not necessary to increase the number of the candidates stored in the data storing means 5. So that, the rewrite command can be outputted in a short period of time because a certain number of candidates minimizes the time for making the judgement.

2. HARDWARE STRUCTURE

Figure 2:
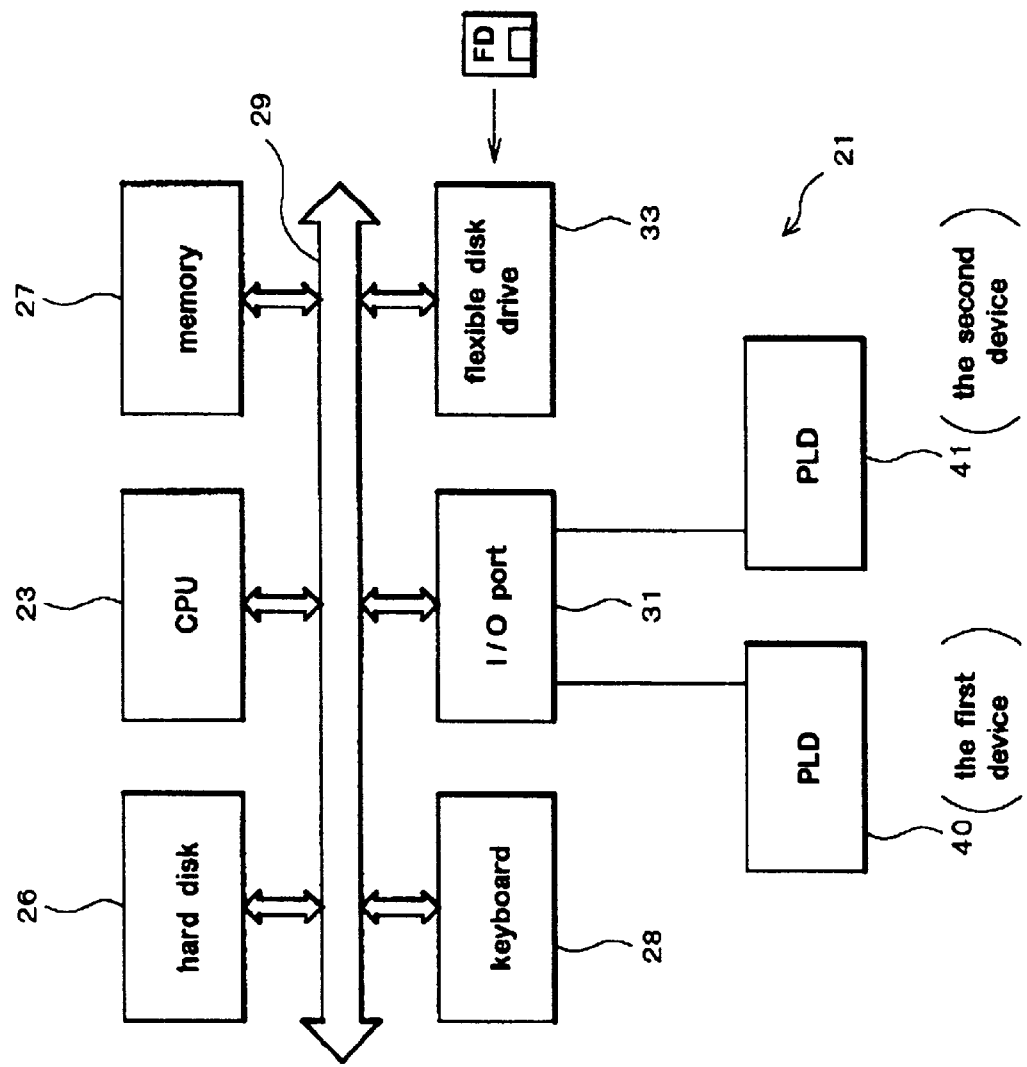
FIG. 2 is an example of hardware structure of the device 1 shown in FIG. 1.

FIG. 2 is an example of hardware structure of the device 1 shown in FIG. 1 by utilizing a center processing unit (hereinafter referred to as CPU).

In FIG. 2, the device 21 for duplicating functions comprises the CPU 23, a memory 27, a hard disk 26, a flexible disk drive (FDD) 33, a key board 28, an input/output (I/O) port 31 and a bus line 29.

The CPU 23 controls other parts in accordance with a control program stored in the hard disk 26 through the bus line 29.

The control program is installed from a flexible disk which stores a program(s) to the hard disk 26 through the FDD 33. The control program may be installed from other memory mediums such as a CD-ROM, an IC card or the like which tangibly embodying a program(s) and readable by a computer. In addition, the control program can be transmitted via a telecommunication line so as to be down-loaded in the hard disk 26.

In this embodiment, the control program stored in the flexible disk is executed indirectly by a computer by installing the control program into the hard disk 26 from the flexible disk. It is not limited to do that, the control program stored in the flexible disk can be executed directly by the computer. The control program which can be executed by the computer in this embodiment is not only the control program itself being executed directly by the computer by installing under as is condition, but also the control program in the embodiments described herein includes a control program which need to be converted such as decompressed data etc. and a control program which can be executed on the computer combining with other modules such as operating systems or library.

Also, a plurality of candidates of algorithms are stored in the hard disk 26. FIG. 3 is a table illustrating examples of algorithms stored in the hard disk 26. Each of the candidates has own number. For instance, the first candidate has an algorithm indicated "output the inputted value as it is". The result figured out by utilizing the algorithm is stored in the memory 27 temporary. Both a PLD 41 as the second device and a PLD 40 as the first device are connected to the I/O port 31. Data input and data output is carried out through the I/O port 31. The key board 28 is used as a command input means for inputting commands.

3. FLOW CHART

The control program stored in the hard disk 26 will be described with reference to FIG. 4 and FIG. 5. As an example, it is assumed that the PLD 40 as the first device always outputs data of three bit length shown in FIG. 6A to FIG. 6D when data of three bit length is supplied as the input data. It is also assumed as another example that none of logic circuit is composed in the PLD 41 as the second device, and the supplied input data is outputted as it is as the output data.

Figure 4:
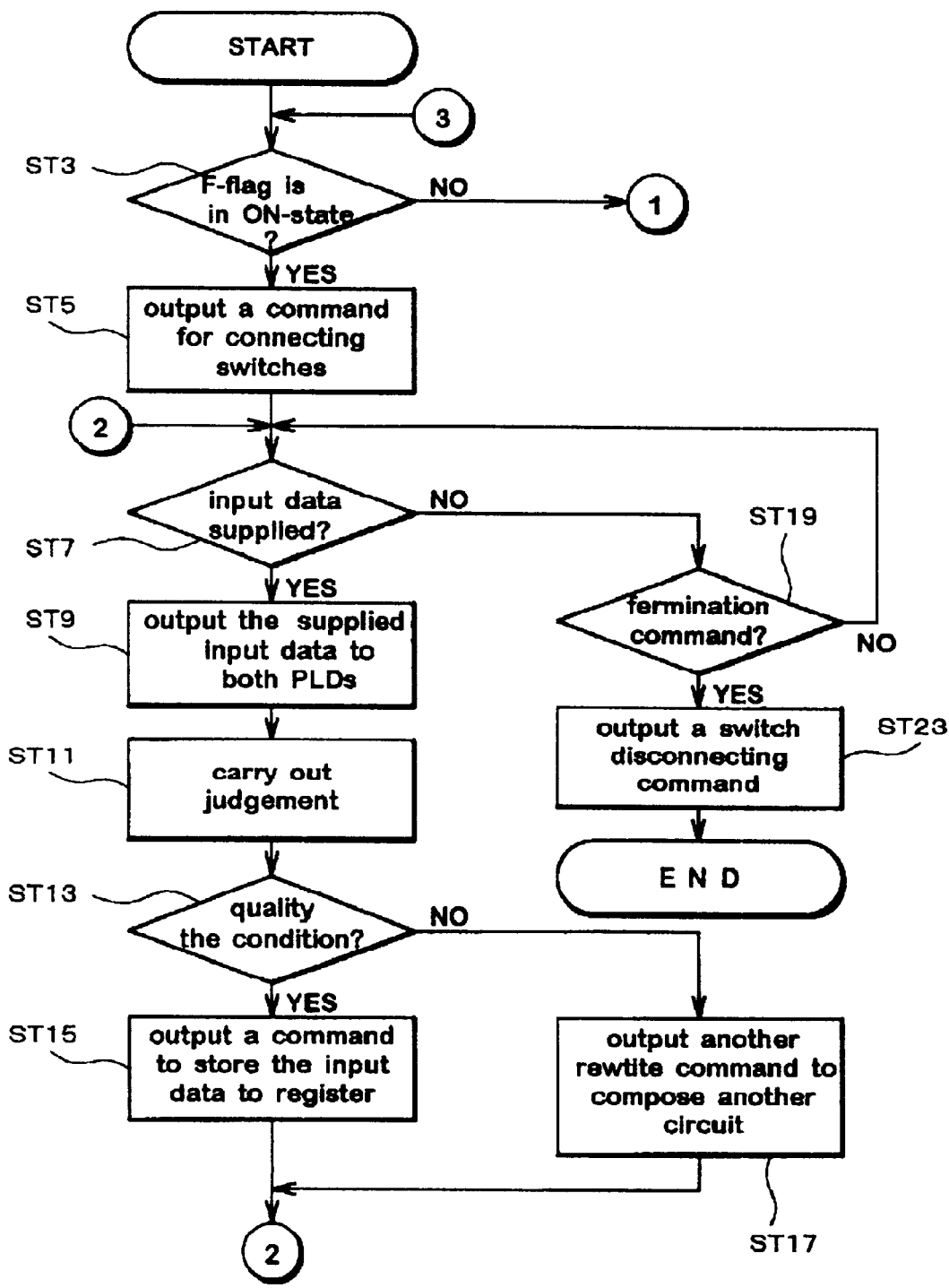
FIG. 4 is a part of a flow chart illustrating a control program of the device 1.

At first, the CPU 23 judges whether a F-flag is in on-state or not (FIG. 4, step ST3). The F-flag is a flag for using to judge whether the rewrite command for forming switching circuits in the PLD 41 is applied or not. Details of the F-flag is described hereinbelow.

At the initial stage, the F-flag is in off-state. So that, the CPU 23 skips execution of the steps until step ST31 shown in FIG. 5 from the step ST3 shown in FIG. 4. The CPU 23 judges whether any of input data is supplied or not (FIG. 5, step ST31).

The CPU 23 skips execution of the steps until step ST39, and judges whether a termination command is outputted or not at the step ST39 when any of the input data is not supplied. The CPU 23 repeats the process of the step ST31 when the termination command is not outputted.

The supplied input data are listed on an input value list of an input data storing part stored in the hard disk 26 by the CPU 23 when the input data are supplied (step ST32). The input data are supplied to both the PLD 40 and the PLD 41 by the CPU 23 (step ST33).

The PLD 40 and the PLD 41 output the output data respectively in accordance with the input data thus supplied. As shown in FIG. 6A, the PLD 40 outputs a first (reference) output data "111" for the input data of "000". Also, the PLD 41 outputs a trial output data (the data to be duplicated) "000" for the input data of "000".

Then, the CPU 23 Judges whether both the reference output data and the trial output data are identical with each other or not (step ST41). In this case, the CPU 23 judges that both the output date of the PLD 40 and the output data of the PLD 41 are not identical with each other because "111" for the reference output data and "000" for the trial output data are outputted respectively. So that, the CPU 23 initialize given number of an algorithm identified as algorithm number i to 0 (FIG. 5, step ST43). Then, the algorithm number i is increased by 1 increment (step ST45). The CPU 23 reads out the algorithm of the algorithm number i stored in the hard disk 26. In this case, the first listed algorithm indicated as "output the inputted value as it is" is read out because the algorithm number i is "1" (see FIG. 3).

The CPU 23 judges whether or not identical value of the reference output data can be outputted by applying the supplied input data stored in the memory 27 to the algorithm thus read out (step ST49). In this case, the input data of "000" is stored in the memory 27 as shown in FIG. 6A. Since the algorithm thus read out (the first listed algorithm) is not the algorithm which converts the input data of "000" into the output data of "111". So that, the CPU 23 judges that the read out algorithm does not convert all the input data listed on the input value list into the output data as expected, and the CPU 23 continues the judgement whether or not all the algorithms have been judged in above manner. The CPU 23 proceeds to the step ST45 due to existence of unjudged algorithms, and the number of the algorithm number i is increased by 1 increment at the step.

Thereafter, the CPU 23 reads out the second listed algorithm of the table shown in FIG. 3, because the algorithm number i is "2" (step ST47). Output data being identical with the reference output data "111" can be obtained by supplying the input data of "000" shown in FIG. 6A to the second listed algorithm indicated as "output inverted input value". So that, the CPU 23 judges that the second listed algorithm is the algorithm which qualifies the condition at the step 49, and the CPU 23 proceeds to step ST53.

Figure 7A:
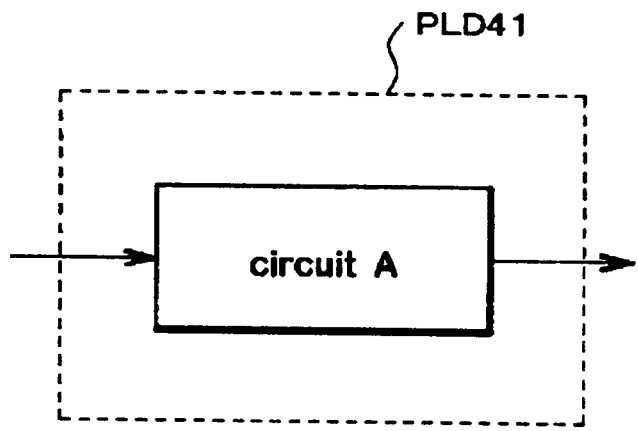
FIG. 7A is a block diagram showing circuit structure of a PLD 41.

The CPU 23 outputs a rewrite command so as to compose a circuit to execute algorithm of the algorithm number i to the PLD 41 through the I/O port 31 (step ST53). Thus, a circuit A which executes algorithm of the algorithm number 2 is formed in the PLD 41 as shown in FIG. 7A.

Figure 8:
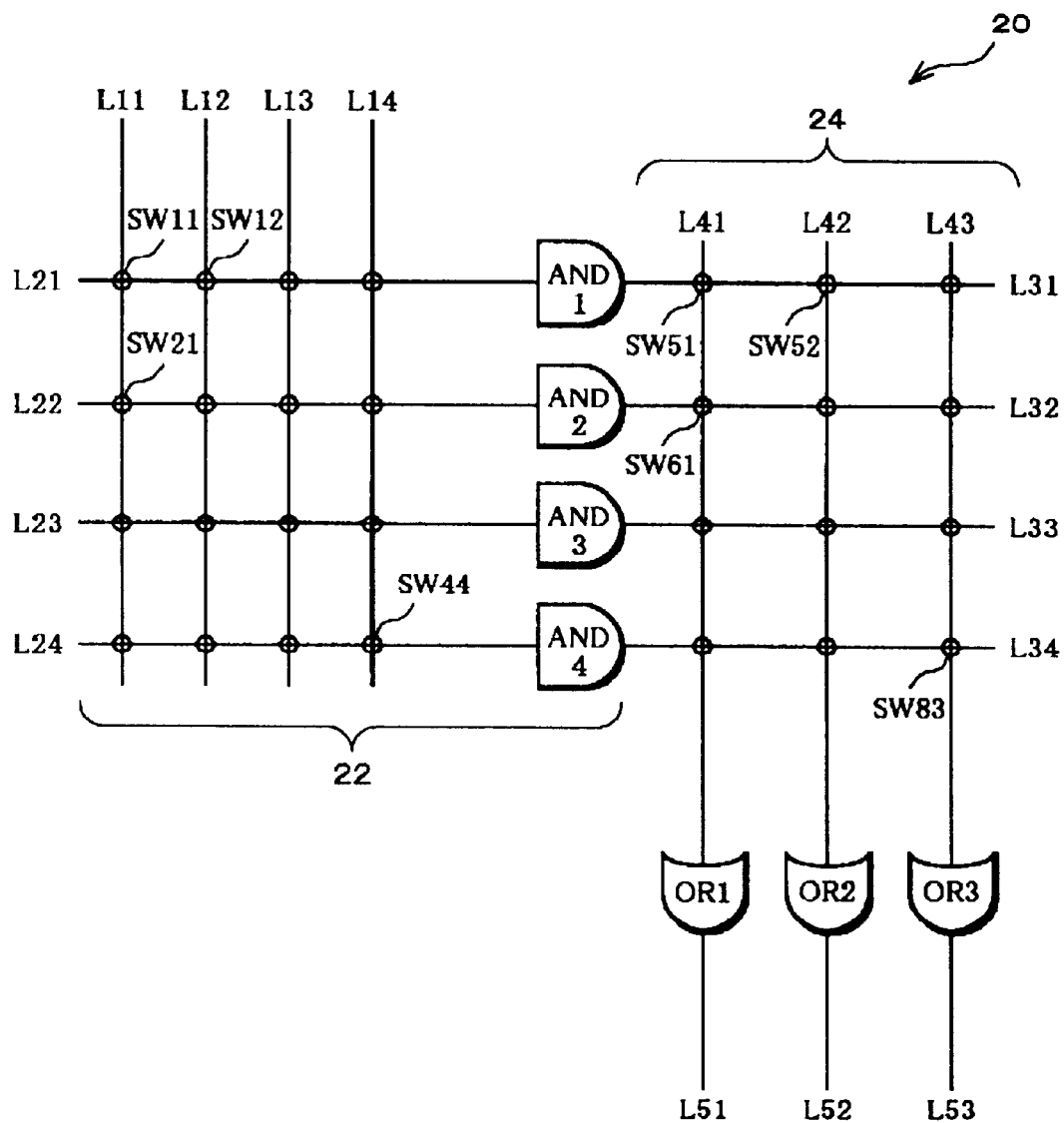
FIG. 8 is a typical view of a part of circuit structure of a logic array composing a PLA in an embodiment of the present invention.

Each of switches SW11 to SW83 shown in FIG. 8 may be turned into either on-state or off-state in order to form the circuit A which executes algorithm of the algorithm number 2 in the PLD 41.

In this embodiment, a logic circuit shown in FIG. 8 a having a plurality of switches is formed in the PLD 41. The logic circuit can be operated by switching a plurality of switches 30 shown in FIG. 9.

A PLA 12 shown in FIG. 8 is described briefly hereunder. The PLA 12 comprises an AND circuit portion 22 and an OR circuit portion 24. FIG. 8 shows a partial circuit diagram of the logic array 20 which is picked up from whole view of the circuit diagram for concise description. So that, the actual logic array 20 has more complex structure than the one shown in FIG. 8. The AND circuit portion 22 shown in FIG. 8 comprises a total of four data input lines L11, L12, L13 and L14, a total of four AND input lines L21, L22 L23 and L24, and a total of four AND gates AND1, AND2, AND3 and AND4, each of which act as circuit element.

A plurality of switches, such as a switch SW11 to a switch SW44 are provided to a total of 16 of interconnecting points formed by the data input lines and the AND input lines both of which belong to the AND circuit portion 22.

The OR circuit portion 24 comprises a total of four AND output lines L31, L32, L33 and L34, a total of three OR input lines L41, L42 and L43, a total of three OR gates OR1, OR2 and OR3, and a total of three OR output lines L51, L52 and L53, each of which act as circuit element.

As described in the AND circuit portion 22, a plurality of switches, a switch SW51 to a switch SW83 are provided to a total of 12 interconnecting points formed by the AND output lines and the OR input lines both of which belong to the OR circuit portion 24.

In this embodiment, four of the AND gates AND1, AND2, AND3 and AND4, three of the OR gates OR1, OR2 and OR3 are used in FIG. 8 as a reason of convenience for description, a total of seven NAND gates are used instead of these gates in the actual circuit in order to realize a circuit which is logically identical with the circuit shown in FIG. 8.

Figure 9:
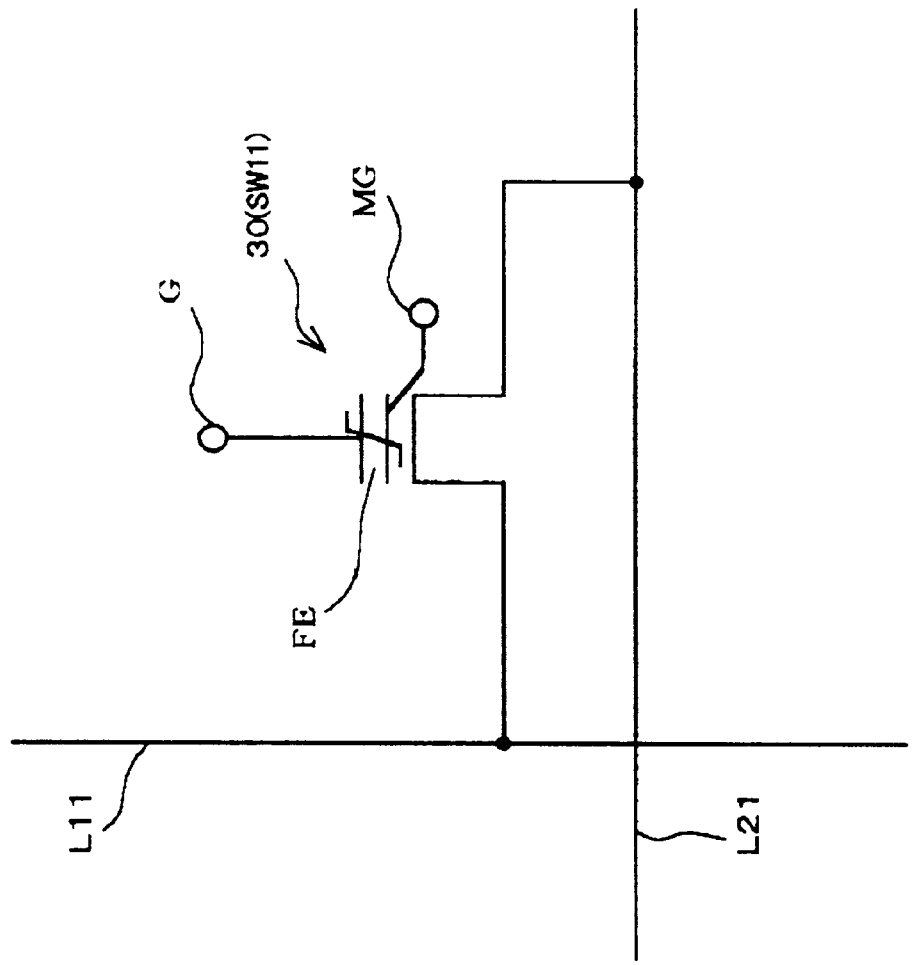
FIG. 9 is an enlarged view of a switch used for the logic array composing the PLA in an embodiment of the present invention.

FIG. 9 is an enlarged circuit diagram of the switch SW11. The switch SW11 is composed by utilizing a ferroelectric transistor 30 in the embodiment. The structure of other switches such as the switch SW12 to the switch SW83 is the same as the switch SW11.

In the switch SW11, a ferroelectric layer FE is polarized when a predetermined voltage is applied between a gate terminal G and a data input line L11. A direction of polarization is depend upon a direction of the applied voltage. Threshold voltage of the ferroelectric transistor 30 is varied when the ferroelectric layer FE is polarized in other directions. Thus, the switch SW11 can be switched into either of open-state to closed-state or closed-state to open-state.

The relationship between the direction of the voltage applied between the gate terminal G and the data input line L11 and the direction of polarization of the ferroelectric layer FE is not always the same because of influences caused by other factors, at least the same relationship can be observed between them unless the conditions are the same.

So that, for instance, the ferroelectric layer FE is polarized in a direction of flowing a predetermined drain current by applying a predetermined gate voltage when a voltage which turns the gate terminal G into a positive state is applied to the data input line L11. The voltage condition described in the above is referred to as the closed-state of the switch SW11 in this embodiment. On the other hand, the ferroelectric layer FE is polarized in a direction of flowing the drain current less than the predetermined value, when the voltage is applied to opposite direction. The voltage condition is referred to as the open-state of the switch SW11 in this embodiment.

Thus, it is possible to rewrite the switching data of the switch SW11 by switching the direction of the voltages applied between the gate terminal G and the data input line L11.

The switch SW11 in the embodiment described in the above is composed so as to switch the direction or the polarization for the ferroelectric layer FE by switching the direction of the voltages applied between the gate terminal G and the data input line L11. It is also possible to compose the switch SW11 so as the ferroelectric layer FE to polarize in another direction by switching the direction of the voltages applied between the gate terminal G and the memory gate terminal MG.

In order to compose a logic circuit which executes a desired algorithm, a compiler well-known to the public which compiles algorithms written in HDL (hardware description language) to rewrite commands determining ON and OFF of the transistors shown in FIG. 8. may be used.

Thereafter, the CPU 23 proceeds to the step ST3 shown in FIG. 4 and judges whether the F-flag is in on-state or not. At this stage, the F-flag is still in off-state. So that, the CPU 23 skips execution of the steps until the step ST31 shown in FIG. 5. At the step ST31, the CPU 23 judges whether or not the next input data is supplied or not. When no input data is supplied at the step ST31, the CPU 23 proceeds to step ST39 and judges whether the termination command is applied or not. The CPU 23 repeats the process of the step ST31 when no termination command is applied.

The input data is listed on the input value list of the input data storing part stored in the hard disk 26 by the CPU 23 when the input data "001" shown in FIG. 6B is supplied (step ST32). The input data is supplied to both the PLD 40 and the PLD 41 by the CPU 23 (step ST33).

Then, the CPU 23 again judges whether both the reference output data and the trial output data are identical with each other or not (step ST41). In this case, the CPU 23 judges that the output data of the PLD 40 and the output data of the PLD 41 are identical with each other because both the reference output data and the trial output data are "110". The CPU 23 makes a judgement that no rewrite command is required at step ST61 because the output data identical with each other are generated by both the PLD 40 and the PLD 41.

Next, operation of the device 21 for duplicating functions is described hereinafter when the input data "111" shown in FIG. 6C is supplied to both the PLD 40 and the PLD 40. The CPU 23 judges that the F-flag is in off-state at the step ST3 as shown in FIG. 4. So that, the CPU 23 executes the step ST31. The supplied input data is listed on the input value list of the input data storing part stored in the hard disk 26 by the CPU 23 when the input data is supplied (step ST32). The input data is supplied to both the PLD 40 and the PLD 41 by the CPU 23 (step ST33). In this case, the PLD 40 outputs the first (reference) output data "100" for the input data of "111". Also, the PLD 41 outputs the trial output data "000" for the input data of "111". The CPU 23 judges the reference output data and the trial output data are not identical with each other at the step ST41. So that, the CPU 23 initialize the given number of an algorithm identified as algorithm number i to 0 at the step ST43. Then, the number of the algorithm number i is increased by 1 increment at the step ST45. Further, the CPU 23 reads out the first listed algorithm at the step ST47 because the algorithm number i is "1".

Figure 7B:
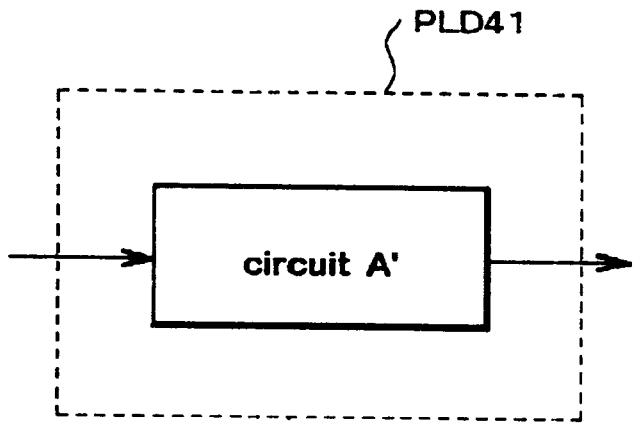
FIG. 7B is another block diagram showing circuit structure of another PLD 41.
Figure 11A:
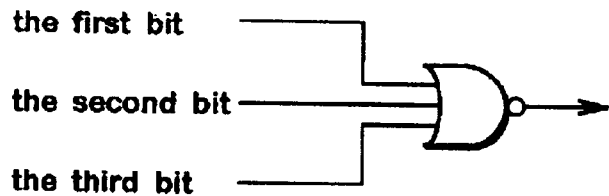
FIG. 11A is an example of algorithm for the LSB (least significant bit) stored in the hard disk 26.
Figure 11B:
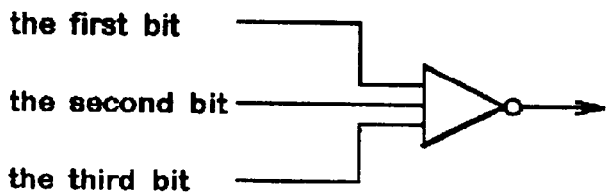
FIG. 11B is an example of algorithm for the second bit stored in the hard disk 26.
Figure 11C:
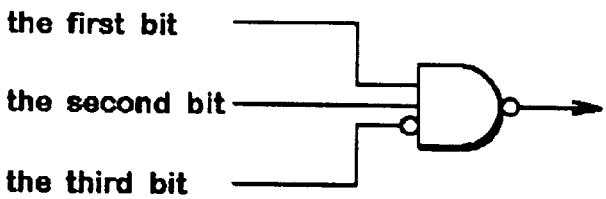
FIG. 11C is an example of algorithm for the MSB (most significant bit) stored in the hard disk 26.

The CPU 23 Judges that the algorithm thus read out is not the algorithm which converts the input data of "111" into the output data "100" shown in FIG. 6C. So that, the CPU 23 proceeds to the step ST51. At the step ST51, the CPU 23 judges whether or not the algorithm number i does not convert all the input data listed on the input value list into the output data as expected, and the CPU 23 continues the judgement whether or not all the algorithms have been judged in above manner. Then, the CPU 23 proceeds to the step ST45 due to existence of unjudged algorithms, and the number of the algorithm number i is increased by 1 increment at the step. The output data shown in FIG. 6A, 6B and 6C are generated respectively by supplying the output data "000", "001" and "111" stored in the input value list of the hard disk 26 to the PLDs when each of the algorithms shown in FIG. 11A, 11B and 11C are used for executing the first bit (most significant bit), second bit and the third bit (least significant bit) respectively. Therefore, the CPU 23 outputs the rewrite command which makes the hardware to execute the algorithm shown in FIG. 11A, 11B and 11C to the PLD 41 through the I/O port 31 (step ST53). Thus, the PLD 41 is rewritten into another circuit A' shown in FIG. 7B which execute above stated algorithms. Description of rewriting is omitted because it has already been described in above.

Thus, the PLD 41 which executes the optimum algorithms can be duplicated by rewriting algorithms stored therein to the algorithms which convert all the supplied input data listed on the input value list of the hard-disk 26 into the expected output data.

Although, the algorithms which have been used for execution are used repeatedly by initialize the given numbers of the algorithms in this embodiment, it is possible to omit using the algorithms which have been used. In that case, the algorithm identified as number i may not be initialized in order to prevent to execute repeatedly.

Further, there is a probability that no algorithms which can convert all the supplied input data into the expected output data are stored in the hard-disk 26. In order to duplicate the functions of the PLD 40 into the PLD 41 as described in above, it is required to carry out following processes.

In this case, there are no algorithms which qualify the condition at the step ST49 even when all the algorithms shown in FIG. 3 are used for execution. So that, the CPU 23 proceeds to the step ST55, and the CPU 23 outputs another rewrite command which composes desired switching circuits to the PLD 41 through the I/O port 31, and turns the F-flag in on-state.

Figure 10:
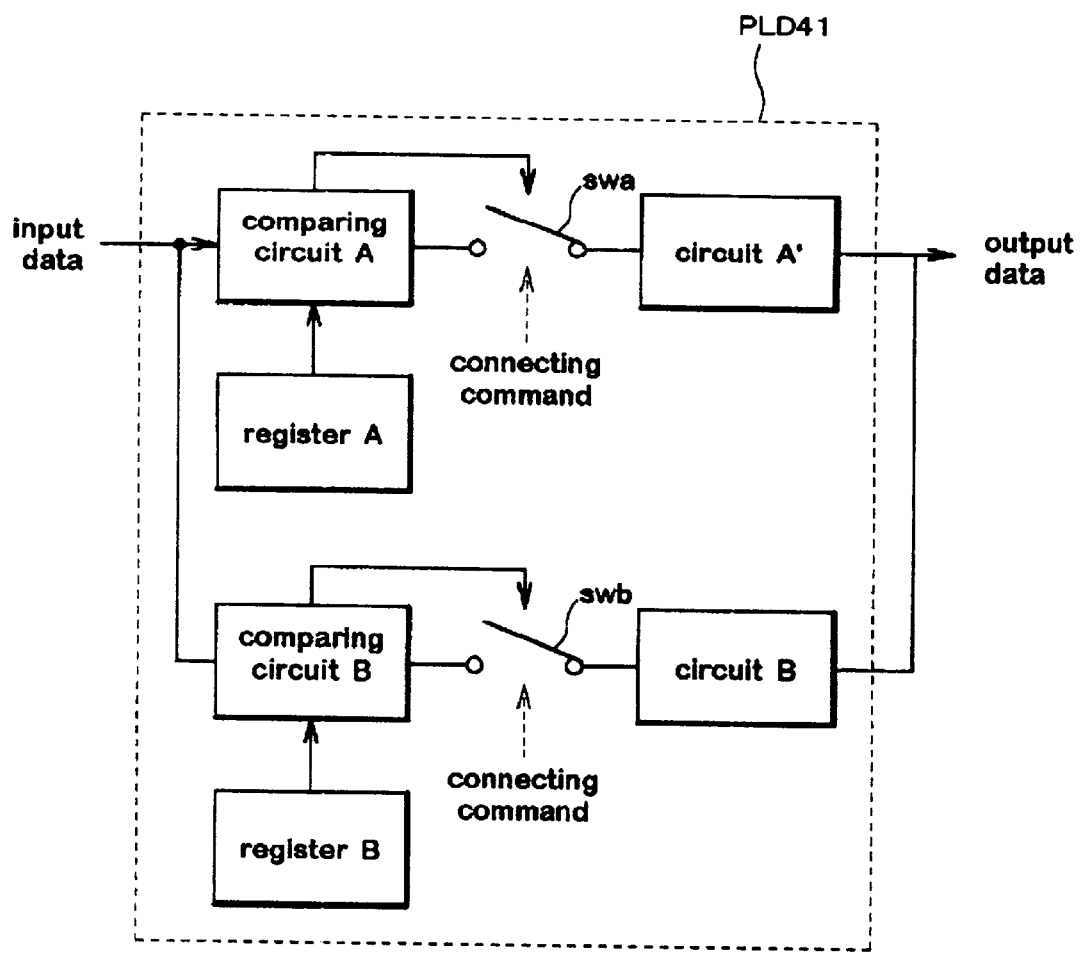
FIG. 10 is a block diagram showing the circuit structure of the PLD 41.

Process at the step ST55 is described herein referring to FIG. 10. It is assumed that the circuit A' has already been composed in the PLD 41. The CPU 23 outputs another rewrite command which composes a circuit B which executes the input data of "010" into the PLD 41 independent from the circuit A'. Because a judgement of no output data of "000" is made in case of using the circuit A' for executing the input data of "010" shown in FIG. 6D. As described in above, the algorithm which execute the input data "010" can be selected by reading out the algorithm shown in FIG. 3 which convert the input data into the reference output data. In that case, the fifth algorithm listed on the table is selected in order to convert the input data "010" into the output data "000". In that case, it is necessary to supply the input data "010" to the circuit B, and to supply the remaining input data to the circuit A'. So that, comparing circuits, registers and switches are provided before composing the circuit A' and the circuit B in order to switch the input data to the desired circuit. Practically, the input data is supplied to both of the comparing circuit A and the comparing circuit B respectively. A plurality of input data executed by the circuit A' are stored in the register A. And a plurality of input data executed by the circuit B are stored in the register B. Both of the comparing circuit A and the comparing circuit B make judgement whether or not any of the input data stored in the registers are identical with the supplied input data. The comparing circuits connected to the register which stores an input data identical with the supplied input data outputs a connecting command to either of a switch SW*a* or a switch SW*b*. Thus, the supplied input data executed in parallel is executed either of the circuit A' or the circuit B.

The switches are turned into on-state compulsorily during the first condition in order for the CPU 23 to judge which circuits is used for executing the supplied input data when another input data is supplied. Practically, the CPU 23 outputs the connecting command to close the switch SW*a* and the switch SW*b* shown in FIG. 10 when the F-flag is in on-state.

Figure 5:
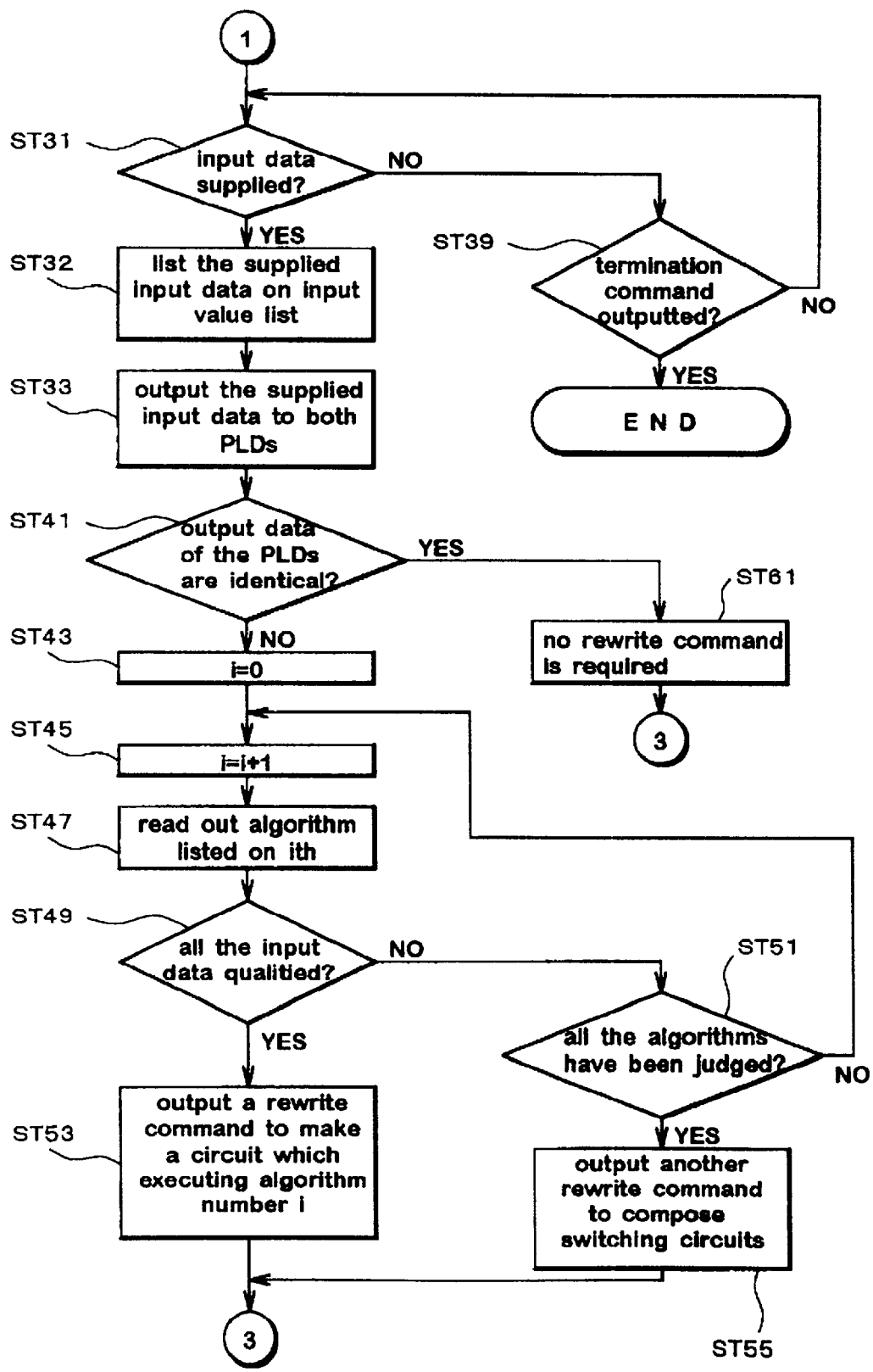
FIG. 5 is a part of the flow chart illustrating the control program of the device 1.

For instance, the F-flag is turned into on-state, once the rewrite command for composing the desired switching circuits in the PLD41 is outputted at the step ST55 shown in FIG. 5. Therefore, the CPU 23 outputs a command for connecting switches because the F-flag is in on-state at the step ST3 shown in FIG. 4 (FIG. 4, step ST5).

Then, the CPU 23 judges whether any of input data is supplied or not (step ST7). Further, the CPU 23 judges whether the termination command is outputted or not when the input data is not supplied (step ST19). The CPU 23 repeats the process of the step ST7 when the termination command is not outputted.

On the contrary, the CPU 23 outputs the supplied input data to the PLD 40 and the PLD 41 when the input data is supplied. Both of the first (reference) output data and the trial output data (output data to be duplicated) are generated by the PLD 40 and the PLD 41. In this case, two of the trial output data described hereinbelow are generated by the PLD 41.

The circuit A' outputs the output data executed with the algorithms shown in FIG. 11A, 11B and 11C. Also, the circuit B outputs the output data executed with the fifth algorithm shown in FIG. 3. These two output data are compared respectively with the reference output data generated by the PLD 40.

The CPU 23 judges that the condition at step ST13 is qualified when either of the two output data is identical with the reference output data. And the CPU 23 outputs an input data storing command for adding the input data to the register (step ST15). For instance, the input data supplied to the register A is stored into the register A when the reference output data is identical with the output data executed by the circuit A'. So that, the circuit A' executes the supplied input data when the supplied input data is identical with the input data executed previously.

Thus, the input data stored in the registers may be changed in order to execute the supplied input data by any of the circuits when a plurality of the circuits have already been composed in the PLD 41.

On the other hand, the CPU 23 proceeds to step ST17 when neither of the output data generated by the circuit A' nor the circuit B at the step ST13 is identical with the reference output data generated by the PLD 40. At the step ST17, the CPU 23 outputs another rewrite command for composing a circuit C in the PLD 41 for carrying out execution of the supplied input data in the same manner as described in above. In other words, another comparing circuit C and another register C are provided for composing the circuit C (not shown).

Switches for the newly composed circuit C (not shown) are turned into on-state compulsorily because the command for connecting switches is outputted at the step ST5.

Thus, it is possible for the device 1 to compose the PLD 41 having the same functions as the PLD 40 by providing the switching circuits for switching the supplied input data to either of the circuits or the circuit thus composed even when all the supplied input data can not be executed with common algorithms.

The CPU 23 outputs a switch disconnecting command for disconnecting all the switches in the PLD 41 when a finalizing command is outputted at a condition shown in FIG. 10. So that, the switches shown in FIG. 10 such as the switch SW*a*, SW*b*, and so on are disconnected. Thus, only the circuit(s) having the register(s) which store the input data identical with the supplied input data can execute the supplied input data by switching the switches in off-state after the first condition.

Although, there is a slight probability of difference in circuit structure between the PLD 40 and the PLD 41 thus duplicated, the functions of the PLD 40 themselves are duplicated into the PLD 41 precisely.

Thus, the CPU 23 judges existence of the algorithms described in above which make all the input data stored in the memory 27 identical with the reference output data. By carrying out the optimization processes described in above, it is not necessary to compose the circuits executing all the algorithms respectively in the PLD 41. Therefore, the PLD 41 having the same functions as the PLD 40 can be duplicated even when the capacity of the PLD 41 does not exceed remarkably than that of the PLD 40 (minimum capacity).

4. OTHER EMBODIMENTS

Although, the second device 19 is composed by the PLD 41 in the embodiment described in above, the second device 19 can be composed as follows.

Figure 12:
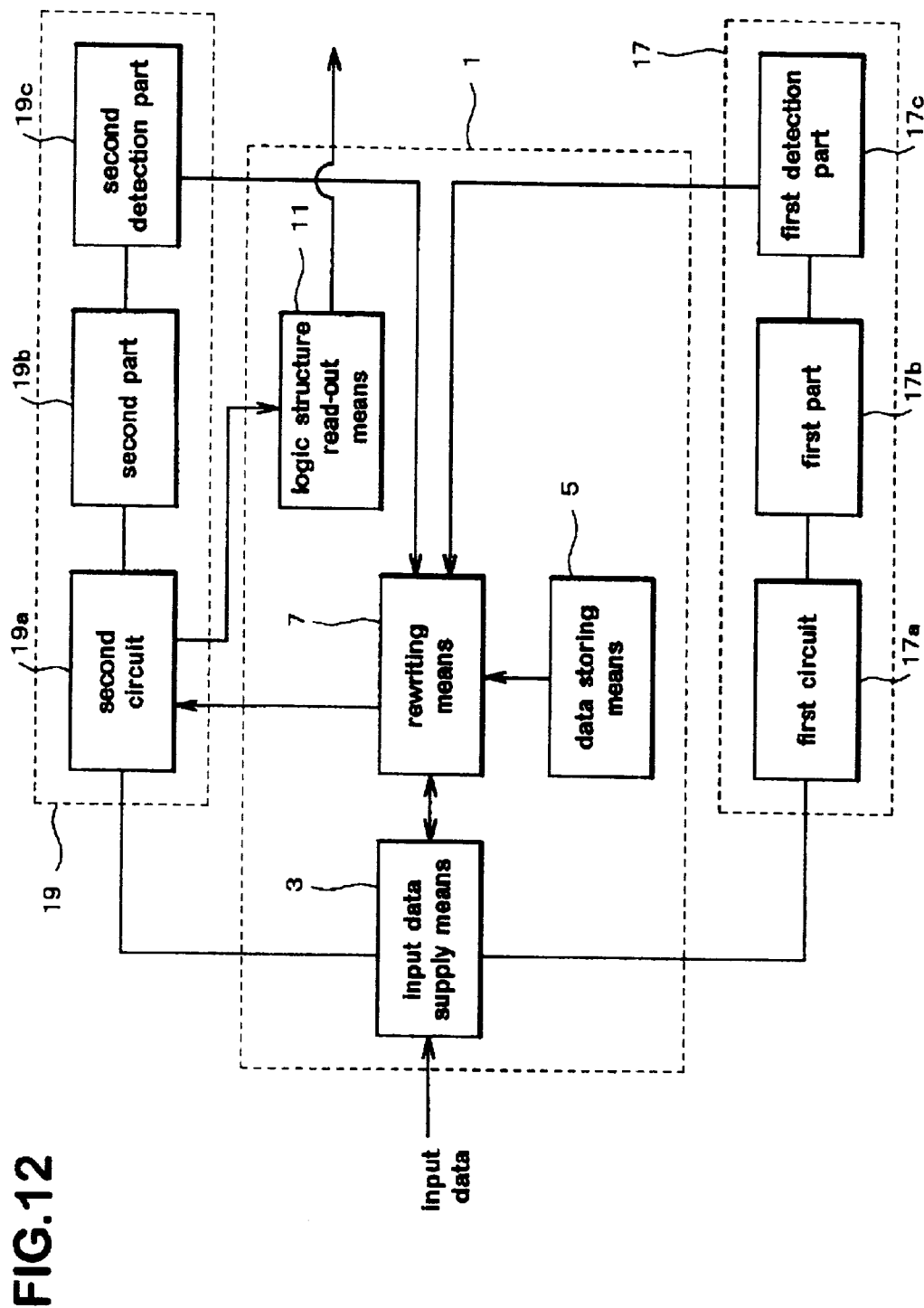
FIG. 12 is another functional block diagram of the device for duplicating functions in the present invention.

As shown in FIG. 12, the second device 19 comprises a second circuit 19*a*, a second part 19*b* controlled by the second circuit 19*a*, and a second detection part 19*c* detecting operation of the second part 19*b*. Further, the first device 17 comprises a first circuit 17*a*, a first part 17*b* controlled by the first circuit 17*a*, and a first detection part 17*c* for detecting operation of the first part 17*b*.

The rewriting means 7 outputs a rewrite command to the second device 19 so as to execute logic data of a selected candidate as well as storing the supplied input data when the rewriting means 7 selects the candidate which makes both the reference output data generated by the first detection part 17*c* and the trial output data detected by the second detection part 19*c* identical with each other. Also, the rewriting means 7 outputs the rewrite command to the second device 19 so as to execute logic data of another selected candidate when the rewriting means 7 selects the candidate which makes both the data generated for another supplied input data and the data generated for all the stored input data identical with each other as a result of carrying out a judgement.

Logic structure of the second device 19 is read out by a logic structure read-out means 11, and the logic structure thus read out is outputted by the logic structure read-out means 11.

Thus, the output data of the second circuit 19*a* identical with the output data generated by the first device 17 can be obtained for all the supplied input data. So that, it is possible to make the second device 19 having the same functions as the first device 17 without carrying out analysis of function thereof. Further, the second device 19 having the same functions as the first device 17 can be made easily and quickly without carrying out the judgement whether both the output data are identical with each other or not.

The present invention can be also applied to other device which comprises PLDs having an additional circuit (for instance, a motor) as the first device and a device having an additional circuit (for instance, another motor) as the second device, while applying the present invention to the device for duplicating functions which duplicates the functions of the PLD 40 into the PLD 41.

Figure 13:
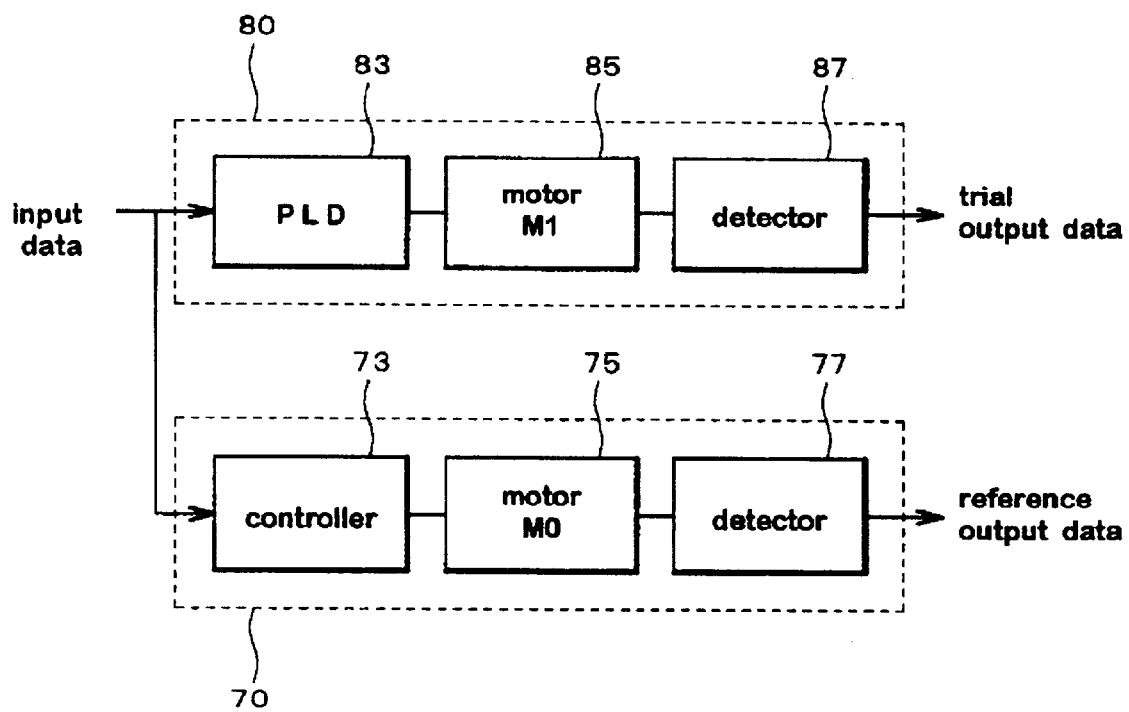
FIG. 13 is a view for describing far another embodiment of the present invention.

For instance, as shown in FIG. 13, the logic in a PLD 83 may be written so as to make the trial output data generated by a detector 87 identical with the reference output data outputted by another detector 77 when an input data is applied to both the device 70 and the device 80. Thus, it is possible to make the device 80 having the same functions as the device 70 even when the characteristics between a motor M1 and a motor M0 is different from each other.

Although, all the supplied input data are stored in the memory 27 and used for judging whether or not to qualify the certain condition for all the supplied input data in the embodiment described in above, only the supplied input data used frequently or the supplied input data used with higher priority may be stored in the memory 27.

Figure 11D:
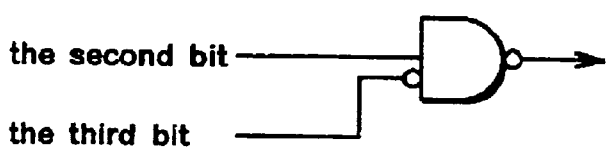
FIG. 11D is another example of algorithm for the first bit.
Figure 11E:
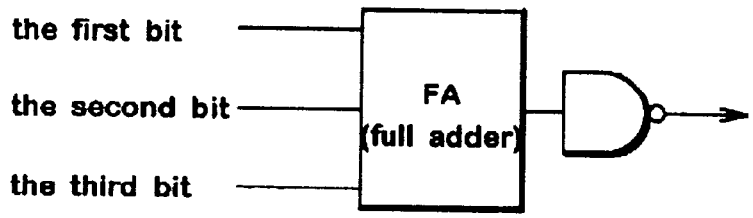
FIG. 11E is another example of algorithm for the third bit.

Meantime, the algorithm of the first bit (most significant bit) shown in FIG. 11C may also be executed by the algorithm shown in FIG. 11D. Further, the algorithm shown in FIG. 11A can also be executed by the algorithm shown in FIG. 11E. Algorithms used for outputting the qualified output data for more input data can be stored by storing the algorithms which refer the relationship with bit supplied previously and the bit supplied afterward.

Although, a plurality of circuits (for instance the circuit A' and the circuit B shown in FIG. 10) both of which executing a certain algorithm are formed in the PLD 41 in the embodiments described above, a table which lists the output data for the supplied input data may be prepared in the PLD 41 instead of the circuits.

Further, one of the algorithms shown in FIG. 3 is selected as the candidate by carrying out a judgement whether or not the reference output data is identical with the reference output data in the embodiment described in above. The present invention does not limited to the method described in above, both the input data and the output data may be generated by both of the difference between the reference output data and the reference output data, and the supplied input data. Thus, the input data and the output data can be generated in either directly or indirectly.

Though, algorithms shown in FIG. 3 are executed sequentially in order of ascending, it is preferred to designate priority of execution of the algorithm listed in FIG. 3. The priority of execution can be selected by utilizing a predetermined equation for processing algorithms for digital filers or the like. So that, the priority of execution can be selected in accordance with the characteristics of the supplied input data. Thus, the logic in the PLD 41 can be rewritten in the shorter period than the embodiments in above.

Further, the supplied input data is used for judging the output data independently in the embodiments described in above. It is possible to use the supplied input data inputted presently in connection with the supplied input data inputted right before the present supplied input data for judging the output data. In this case, the supplied input data inputted right before the present supplied input data is read out from the supplied input data which have already been stored, and the supplied input data inputted right before thus read out is used for judging the output data together with the present supplied input data.

For instance, there is a case that value of the two output data are different from each other even when the present supplied input data for the two output data are identical with each other as "001". It is assumed that value of the supplied input data inputted right before the present supplied input data are "000" and "111" respectively in the case stated above. In that case, a judgement may be carried out depend upon the value of the supplied input data inputted right before the present supplied input data whether it is "000" or "001".

Also, value of the supplied input data inputted prior to the present supplied input data such as the supplied input data inputted secondly, thirdly and so on before the present supplied input data may be considered in the judgement as well as the supplied input data inputted right before the present supplied input data when history of the supplied input data is considered.

Duplication of the PLD 40 is carried out so as the PLD 41 has the same functions as the PLD 40 in the embodiments described in above. It consumes much time for duplicating the functions of the PLD 40 into the PLD 41 because the judgement must be carried out for a great number of input data respectively. On the contrary, duplication itself can be carried out in a short period of time when duplication of the PLD 41 is completed. So that, another duplication of the function to another PLD may be carried out by reading out the function of the PLD 41, once the PLD 41 having the same functions as the PLD 40 is completed. Practically, the data stored in the PLD 41 are read out by a ROM reader, and the data thus read out are stored into the PLD with a ROM writer. By carrying out the duplication utilizing the ROM reader and the ROM writer, a plurality of PLD having the same functions as the first device can be duplicated in a short period of time even when following cases such as the logic can not be read out in usual manner and the first device is not a PLD.

Although, the input data of three bit length shown in FIG. 6 are used in the description of the embodiments in above, there is no restriction to use the data structure.

Although, the ferroelectric memory element having a ferroelectric capacitance and a ferroelectric transistor are used as an example of the memory element having the ferroelectric layer in the embodiments described in above, other elements having the same characteristics with the ferroelectric memory element having the ferroelectric capacitance and the ferroelectric transistor can be used.

Further, the present invention can also be applied to the FPGA or similar arrays even though the PLA shown in FIG. 8 and FIG. 9 is used as an example of a PLD capable of programming logic functions by the user(s). Still further, the present invention can also be applied generally to a device capable of programming logic functions.

While the invention has been described in its preferred embodiments, it is to be understood that the words which have been used are words of description rather than limitation and that changes within the purview of the appended claims may be made without departing from the true scope and spirit of the invention in its broader aspects.

5. DEFINITION OF TERMS

The terms used in the embodiments and the claims for describing the present invention are defined as below:

Input data supply means: The processes themselves executed by the CPU 23 at the step ST9 shown in FIG. 4 and the step ST33 shown in FIG. 5 in the embodiments are equivalent to the input data supply means. The input data supply means may be composed so as to supply the input data to both the PLD 40 and the PLD 41 without carrying out the judgement of the input data when the input data is supplied.

Storing means: The hard disk 26 which stores the candidates shown in FIG. 3 is used as the storing means in the embodiments.

Rewriting means: The processes themselves executed by the CPU 23 at the step ST49 and the step ST53 in FIG. 5 or the process at the step ST13 and the step ST15 and step ST23 in FIG. 5 are equivalent to the rewriting means.

6. ADVANTAGE OF THE PRESENT INVENTION

In the device for duplicating functions and the method for duplicating functions in the present invention, a plurality of logic data as candidates for outputting an output data correspond to a specific input data are stored, a rewrite command for rewriting logic of a circuit in the second device is outputted by a rewriting means, the logic circuit rewrited in the second device makes a trial output data generated by the second device identical with a reference output data generated by the first device for all the supplied input data, and the logic of a circuit is selected from the candidates stored in the storing means. So that, the second device which outputs the output data identical with the output data generated by the first device for all the supplied input data can be made. Thus, it is possible to make the second device having the same functions as the first device without carrying out analysts of the functions thereof.

Further, in the device for duplicating functions in the present invention, the logic structure read-out means reads out logic structure of the second device, and the logic structure thus read out is outputted by the logic structure read-out means. So that, the second device having the same functions with the first device can be made easily and quickly without carrying out the judgement whether both the output data are identical with each other or not.

Still further, in the device for duplicating functions and the method for duplicating functions in the present invention, the rewriting means outputs a rewrite command to the second device so as to execute logic data of a selected candidate as well as storing the supplied input data when the rewriting means selects the candidate which makes both the reference output data generated by the first detection part and the trial output data detected by the second detection part identical with each other. And the rewriting means outputs the rewrite command to the second device so as to execute logic data of another selected candidate when the rewriting means selects the candidate which makes both the data generated for another supplied input data and the data generated for all the stored input data identical with each other as a result of carrying out a judgement. So that, the second device which outputs the output data identical with the output data generated by the first device for all the supplied input data can be made. Thus, it is possible to make the second device having the same functions as the first device without carrying out analysis of the functions thereof even when the second device has the second circuit and the second part which is controlled by second circuit.

Even further, in the device for duplicating functions and the method for duplicating functions in the present invention, the rewriting means outputs a rewrite command which executes the logic of a first selected candidate to the second circuit as well as storing the supplied input data when the rewriting means selects the candidate which makes both the reference output data generated by the first detection part and the trial output data detected by the second detection part identical with each other. And, the rewriting means judges whether or not a second selected candidate which makes both the reference output data and the trial output data generated for another supplied input data and all the stored input data identical with each other is stored when another input data is supplied, and then the rewriting means outputs a rewrite command to the second circuit so as to execute the logic of the second selected candidate when the rewriting means judges that the second selected candidate is stored. So that, detection of the candidate can be finalized when the rewriting means selects the candidate which makes both the output data identical with each other. Thus, it is possible to realize the device for duplicating functions which is able to handle all the supplied input data in a certain phase as fast as possible with minimum capacity by rewriting the second device sequentially.

Further, in the device for duplicating functions and the method for duplicating functions in the present invention, the rewriting means outputs a rewrite command to the second device so as to execute logic data of a candidate, the candidate being selected within the candidates stored in the storing means, the candidate thus selected makes the trial output data generated by the second device and the reference output data generated by the first device identical with each other for the supplied input data. And the rewriting means outputs another rewrite command for providing a region in the second device, data processing being carried out in accordance with the supplied input data at the region provided in the second device when the candidate which makes both the trial output data generated by the second device and the reference output data generated by the first device identical with each other for all the supplied input data can not be selected by the rewriting means. So that, it is not necessary to increase the number of the candidates stored in the data storing means. Thus, the number of carrying out the judgement whether or not both the output data being identical with each other is decreased.

What is claimed is:

1. A device for duplicating functions of a first device into a second device having rewritable logic circuit, the first device outputting an output data correspond to a predetermined input data supplied thereto, the device for duplicating functions comprising:

an input data supply means for supplying the predetermined input data to the first device and the second device, a storing means for storing a plurality of logic data as candidates for outputting an output data correspond to a specific input data, and a rewriting means for outputting a rewrite command for rewriting logic of a circuit in the second device, a logic of a candidate being selected from the candidates stored in the storing means so as to make a trial output data generated by the second device being identical with a reference output data generated by the first device for all the supplied input data.

2. A device for duplicating functions in accordance with claim 1, further comprising:

a logic structure read-out means for reading out logic structure of the second device, the logic structure thus read out being outputted by the logic structure read-out means.

3. A device for duplicating functions in accordance with claim 1, wherein the first device comprises a first circuit, a first part controlled by the first circuit, and a first detection part for detecting operation of the first part, and wherein the second device comprises a second circuit, a second part controlled by the second circuit, and a second detection part for detecting operation of the second part, and wherein the rewriting means carries out a judgement whether both the data detected by the first detection part and the second detection part data are identical with each other or not.

4. A device for duplicating functions in accordance with claim 3, wherein the rewriting means outputs a rewrite command which executes the logic of a first selected candidate to the second circuit as well as storing the supplied input data when the rewriting means selects the candidate which makes both the reference output data generated by the first detection part and the trial output data detected by the second detection part identical with each other, and wherein the rewriting means Judges whether or not a second selected candidate which makes both the reference output data and the trial output data generated for another supplied input data and all the stored input data identical with each other is stored when another input data is supplied, and then the rewriting means outputs a rewrite command to the second circuit so as to execute the logic of the second selected candidate when the rewriting means judges that the second selected candidate is stored.

5. A device for duplicating functions in accordance with claim 3, wherein the rewriting means outputs a rewrite command for providing a region in the second device, the region carrying out data processing in accordance with the supplied input data when a candidate which makes both the reference output data generated by the first device and the trial output data generated by the second device identical with each other for all the supplied input data can not be selected by the rewriting means.

6. A device for duplicating functions in accordance with claim 3, further comprising:

a logic structure read-out means for reading out logic structure of the second device, the logic structure thus read out being outputted by the logic structure read-out means.

7. A device for duplicating functions in accordance with claim 1, wherein the rewriting means outputs a rewrite command which executes the logic of a first selected candidate to the second device as well as storing the supplied input data when the rewriting means selects the candidate which makes both the reference output data generated by the first device and the trial output data detected by the second device identical with each other, and wherein the rewriting means judges whether or not a second selected candidate which makes both the reference output data and the trial output data generated for another supplied input data and all the stored input data identical with each other is stored when another input data is supplied, and then the rewriting means outputs a rewrite command to the second device so as to execute the logic of the second selected candidate when the rewriting means judges that the second selected candidate is stored.

8. A device for duplicating functions in accordance with claim 7, further comprising:

a logic structure read-out means for reading out logic structure of the second device, the logic structure thus read out being outputted by the logic structure read-out means.

9. A device for duplicating functions in accordance with claim 1, wherein the rewriting means outputs a rewrite command to the second device so as to execute logic data of a candidate, the candidate being selected within the candidates stored in the storing means, the candidate thus selected makes the trial output data generated by the second device and the reference output data generated by the first device identical with each other for the supplied input data, and wherein the rewriting means outputs another rewrite command for providing a region in the second device, the region carrying out data processing in accordance with the supplied input data when a candidate which makes both the reference output data generated by the first device and the trial output data generated by the second device identical with each other for all the supplied input data can not be selected by the rewriting means.

10. A program storage medium readable by a machine, storing a program to perform a device for duplicating functions in accordance with claim 1.

11. A device for duplicating functions in accordance with claim 1, wherein the second device is a programmable logic device (PLD).

12. A device for duplicating functions in accordance with claim 1, wherein the first device is a large scale integrated circuit (LSI).

13. A computer data signal embodied in a carrier wave, wherein the data signal forms a program, the program realizes the device for duplicating functions as defined in claim 1.

14. A method for duplicating functions of a first device into a second device having rewritable logic circuit, the first device outputting an output data correspond to a predetermined input data supplied thereto, the method comprising steps of:

step for storing a plurality of logic data as candidates for outputting an output data correspond to a specific input data, step for supplying the predetermined input data to the first device and a second device, step for outputting a rewrite command for rewriting logic of a circuit in the second device, the logic rewrited in the second device making a trial output data generated by the second device identical with a reference output data generated by the first device for all the supplied input data, the logic of the circuit being selected from the candidates.

15. A method for duplicating functions in accordance with claim 14, wherein the first device comprises a first circuit and a first part controlled by the first circuit, and wherein the second device comprises a second circuit and a second part controlled by the second circuit, and wherein the predetermined input data is supplied to both the first device and the second device, and wherein logic data of a candidate which makes operation of the first part and operation of the second part identical with each other for all the supplied input data is selected, and wherein a rewrite command for executing the logic data of the selected candidate is outputted.

16. A method for duplicating functions in accordance with claim 14, wherein a rewrite command is outputted to the second device so as to execute logic data of a selected candidate as well as storing the supplied input data when a candidate which makes both the reference output data generated by the first device and the trial output data generated by the second device identical with each other is selected, and wherein another rewrite command is outputted to the second device so as to execute logic data of another selected candidate when the candidate which makes both the data generated for another supplied input data and the data generated for all the stored input data identical with each other is selected as a result of carrying out a judgement.

17. A method for duplicating functions in accordance with claim 14, wherein a rewrite command is outputted to the second device so as to execute logic data of a candidate, the candidate being selected within the candidates of the stored logic, the candidate thus selected makes the reference output data generated by the first device and the trial output data generated by the second device identical with each other for the supplied input data, and wherein another rewrite command for providing a region in the second device is outputted, the region carrying out data processing in accordance with the supplied input data when a candidate which makes both the reference output data generated by the first device and the trial output data generated by the second device identical with each other for all the supplied input data can not be selected.

18. A method for duplicating functions in accordance with claim 14, wherein the second device is a programmable logic device.

19. A method for duplicating functions in accordance with claim 18, wherein first device is a large scale integrated circuit (LSI).

* * * * *